United States Patent
Gourraud

(10) Patent No.: US 7,715,370 B2
(45) Date of Patent: May 11, 2010

(54) METHOD AND SYSTEM FOR SUBSCRIBING A USER TO A SERVICE

(75) Inventor: Christophe Gourraud, Fribourg (CH)

(73) Assignee: Swisscom AG, Bern (CH)

( * ) Notice: Subject to any disclaimer, the term of this patent is extended or adjusted under 35 U.S.C. 154(b) by 540 days.

(21) Appl. No.: 11/491,292

(22) Filed: Jul. 24, 2006

(65) Prior Publication Data

US 2007/0038723 A1 Feb. 15, 2007

(30) Foreign Application Priority Data

Aug. 11, 2005 (EP) .................................. 05405471

(51) Int. Cl.
- H04L 12/66 (2006.01)
- H04L 12/28 (2006.01)
- H04M 1/64 (2006.01)
- H04M 11/00 (2006.01)
- H04M 3/42 (2006.01)
- G06F 15/16 (2006.01)

(52) U.S. Cl. .................. 370/352; 370/389; 370/400; 379/88.17; 379/90.01; 379/201.01; 709/218

(58) Field of Classification Search .................. None
See application file for complete search history.

(56) References Cited

U.S. PATENT DOCUMENTS

| | | | |
|---|---|---|---|
| 7,139,370 B1 * | 11/2006 | Tse | 379/88.17 |
| 2004/0015562 A1 * | 1/2004 | Harper et al. | 709/217 |
| 2004/0246965 A1 * | 12/2004 | Westman et al. | 370/392 |
| 2005/0002381 A1 * | 1/2005 | Westman et al. | 370/352 |
| 2005/0155036 A1 | 7/2005 | Tiainen et al. | |
| 2005/0190772 A1 * | 9/2005 | Tsai et al. | 370/395.52 |
| 2006/0030320 A1 * | 2/2006 | Tammi et al. | 455/435.2 |
| 2006/0268835 A1 * | 11/2006 | Hyotylainen et al. | 370/352 |
| 2009/0089435 A1 * | 4/2009 | Terrill et al. | 709/227 |

FOREIGN PATENT DOCUMENTS

| | | |
|---|---|---|
| WO | WO 2004/088950 A1 | 10/2004 |
| WO | WO 2005/015870 A1 | 2/2005 |
| WO | WO 2005/027459 A1 | 3/2005 |

\* cited by examiner

*Primary Examiner*—Huy D Vu
*Assistant Examiner*—Brandon Renner
(74) *Attorney, Agent, or Firm*—Oblon, Spivak, McClelland, Maier & Neustadt, L.L.P.

(57) ABSTRACT

For subscribing a user to a service offered by a first application server (SIP-AS1) of an Internet Protocol Multimedia Subsystem, a request for the service, addressed to a public service identifier of the service, is received from the user in a Call Session Control Function unit (S-CSCF). The request is evaluated based on filter criteria (iCF) associated with the user. In absence of the filter criteria (iCF) associating the service with the first application server (SIP-AS1), the request is forwarded to a second application server (SIP-AS2) based on addressing information obtained from filter criteria (FC) associated with the public service identifier. The second application server (SIP-AS2) transmits to the user a message that includes means for enabling the user to subscribe to the service. Users can be subscribed to a service at the time they desire to use the service, immediately preceding usage of the service. IMS user profiles are used as the basis for deciding whether or not a user is subscribed to a service, consequently, there is no need to provide interfaces to data repositories of multimedia services for determining the subscription status of a user. Subscription mechanisms for multimedia services can be centralized in a dedicated application server.

8 Claims, 2 Drawing Sheets

METHOD AND SYSTEM FOR SUBSCRIBING A USER TO A SERVICE

FIELD OF THE INVENTION

The present invention relates to a method and a system for subscribing a user to a service. Specifically, the present invention relates to a method and a system for subscribing a user to a service offered by an application server of an Internet Protocol Multimedia Subsystem.

BACKGROUND OF THE INVENTION

For providing IP multimedia services over mobile communication networks, the Third Generation Partnership Project (3GPP) defined the Internet Protocol (IP) Multimedia Subsystem (IMS) in 3GPP TS 23.228 V6.8.0, IP Multimedia Subsystem (IMS) Stage 2, $3^{rd}$ Generation Partnership Project. Multimedia services include a variety of services over both traditional circuit switched media (e.g. voice) and packet switched media (e.g. pictures, video, audio, instant messaging, presence, push-to-talk, chat rooms, etc,). IMS makes it possible for users to use multimedia real-time and non-real-time communication services as well as data oriented multimedia services. IMS supports multimedia services over IP-based networks between end-users as well as between end-users and servers. In addition to mobile radio networks, access over wireless local area networks (WLAN) has been included in the IMS specifications and even fixed IP-based networks can be integrated in IMS making IMS a generic framework for multimedia services over IP. For setting up and controlling calls and sessions between user equipment and/or application servers, IMS includes so-called Serving Call Session Control Function (S-CSCF) units using the transaction-based Session Initiation Protocol (SIP) and Session Delivery Protocol (SDP) defined in 3GPP TS 24.229 V6.5.1, IP Multimedia Call Control Protocol based on Session Initiation Protocol (SIP) and Session Description Protocol (SDP), Stage 3, $3^{rd}$ Generation Partnership Project. A SIP transaction or dialogue is between two end-points called user agents. Typically, a SIP transaction or dialogue is a multimedia session performed between devices. There are different SIP methods for initiating a SIP transaction or dialogue (e.g. INVITE, SUBSCRIBE or MESSAGE).

In order to control access to a multimedia service, users typically must subscribe to the service prior to using the service. However, a service appears to be less attractive to users, if the subscription process is required to take place a significant amount of time, e.g. hours, days or even weeks, before the service can be used. On the other hand, if a subscription to a service is to be possible at the time the user desires to use the service, immediately preceding usage of the service, generally, the user must know how to access the subscription process for the multimedia service and the user's device must be setup for accessing the subscription process. Moreover, if the multimedia services enable dynamic and spontaneous ("on the fly") subscriptions, performed immediately preceding the usage of the service, the multimedia services include appropriate mechanisms. Considering the vast number and variety of multimedia services, an enormous overhead is required for the implementation and maintenance of such mechanisms. Particularly, each multimedia service requires an associated data repository for storing user subscriptions as well as an interface for accessing and updating the data repository.

US 2005/0155036 describes a system for providing to a user services of a serving entity, such as an application server, in a communication network, such as IMS. According to US 2005/0155036 a user's service registration message is sent via a control entity, such as an S-CSCF, to a serving entity group having a plurality of serving entities, each of which is configured to provide the service. Upon receiving a message acknowledging the registration message and including an address of a selected one of the serving entities, the control entity stores the address of the selected serving entity in an address table. Accordingly, future respective service requests from the user will be routed by the control unit to the address of the selected serving entity stored in the address table.

SUMMARY OF THE INVENTION

It is an object of this invention to provide a method and a system for subscribing a user to a service offered by an application server of an Internet Protocol Multimedia Subsystem, which system and method do not have the disadvantages of the prior art. In particular, it is an object of the present invention to provide a method and a system for subscribing a user to the service at the time the user desires to use the service, immediately preceding usage of the service.

According to the present invention, these objects are achieved particularly through the features of the independent claims. In addition, further advantageous embodiments follow from the dependent claims and the description.

According to the present invention, the above-mentioned objects are particularly achieved in that a request for the service, offered by a first application server of an Internet Protocol Multimedia Subsystem, is received from the user in a Call Session Control Function unit; in that the request is evaluated in the Call Session Control Function unit based on filter criteria associated with the user; in that, in absence of the filter criteria associating the service with the first application server, the request is forwarded from the Call Session Control Function unit to a second application server; and in that a message, including means for enabling the user to subscribe to the service, is transmitted from the second application server to the user. Particularly, the request for the service is a Session Initiation Protocol request, originating in a device of the user, addressed to a public service identifier of the service, and transmitted via a telecommunications network. Particularly, the filter criteria associated with the user include conditions on requests and addresses of application servers, to which a particular request is to be forwarded in case conditions on the particular request are met. Particularly, the application servers are Session Initiation Protocol application servers.

Initiating a process for subscribing the user to a service, in response to a user request for that service, makes it possible to subscribe the user to the service at the time the user desires to use the service, immediately preceding usage of the service. Deciding in the Call Session Control Function unit serving the user whether or not the user is subscribed to a requested service and making that decision based on filter criteria associated with the user have the advantage that features of IMS can be used for these purposes, i.e. there is no need for additional service specific mechanisms. The IMS user profiles, containing the filter criteria typically used for routing purposes, are taken as the basis for deciding whether or not a user is subscribed to a service. Specifically, if the filter criteria do not associate the service request with the application server offering the service, the user is considered to have no subscription. Consequently, there is no need to provide interfaces to data repositories of multimedia services to determine whether or not a user has a subscription to a particular multimedia service. Forwarding service requests, from users having no subscription to the service, to a second application server makes it possible to place subscription mechanisms in the second application server configured and dedicated to handling user subscriptions for multimedia services. Consequently, there is no need to provide each multimedia service with its own individual mechanism for handling user subscriptions. Furthermore, the application server providing the multimedia service is not burdened with handling user subscriptions and/or inquiries concerning user subscriptions.

Preferably, the request for the service is addressed to a public service identifier of the service. Further filter criteria, including addressing information of the second application server, are stored associated with the public service identifier. The request is forwarded from the Call Session Control Function unit to the second application server based on the addressing information obtained from the further filter criteria associated with the public service identifier. Addressing the service request to a unique public service identifier of the service has the advantage that the multimedia service can be accessed by the user specifying simply the public service identifier of the service, for example a name or URI (Uniform Resource Locator) such as service@provider.net. Consequently, the user can access the service using defined protocols; particularly SIP, without the need of installing additional or special purpose access software in the user equipment. Setting up the second application server as a SIP application server having an entry in a user profile associated with the public service identity makes it possible to forward the service request to the second application server using conventional SIP routing in IMS, i.e. there is no need for additional or special purpose mechanisms, routing or directory services.

In a preferred embodiment, in response to subscription data received from the user, a subscription service unit modifies in a home subscriber server the filter criteria associated with the user such that the service is associated with the first application server. In different embodiments, the subscription service unit is implemented on the same computer as the second application server, for example as part of the second application server, on a separate computer connected to the second application server, or as part of the second application server offering the service. Updating in the IMS home subscriber server the IMS user profile of a user having subscribed to the service makes it possible to provide a data repository for controlling user subscriptions to multimedia services using features of IMS, i.e. without the need for additional service specific mechanisms.

In a further preferred embodiment, the means for enabling the user to subscribe to the service include a hyperlink to the subscription service unit. When activated, the hyperlink initiates a subscription process between the user and the subscription service unit. Providing the user with a hyperlink to the subscription service unit has the advantage that the user is enabled to access easily and efficiently the subscription service unit and that the location of the subscription service unit may be changed dynamically without the need of adapting interfaces and/or user equipment to access the subscription service unit.

BRIEF DESCRIPTION OF THE DRAWINGS

The present invention will be explained in more detail, by way of example, with reference to the drawings in which.

DETAILED DESCRIPTION OF THE PREFERRED EMBODIMENTS

Figure 1:
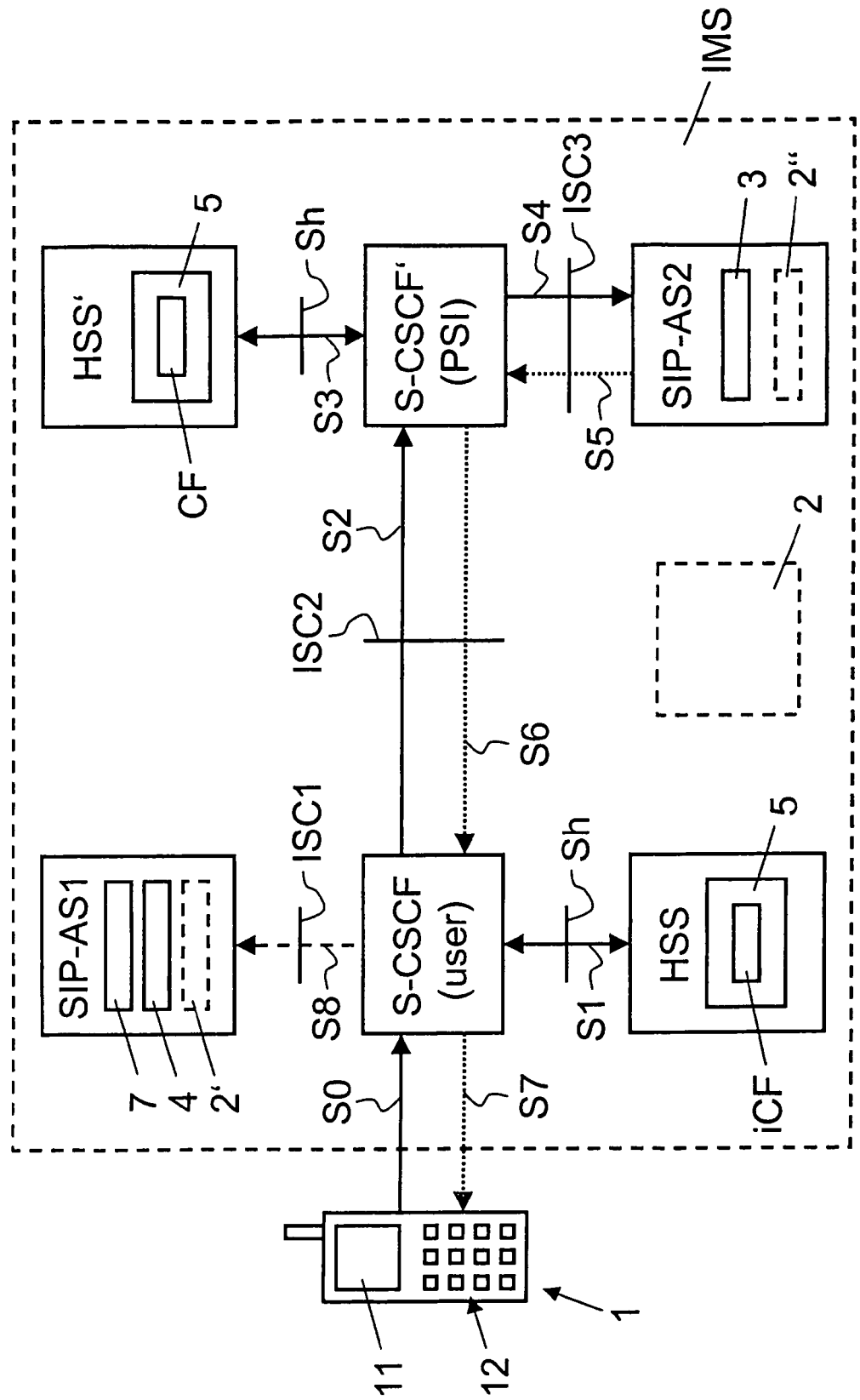
FIG. 1 shows a block diagram illustrating schematically an exemplary configuration of a system for subscribing a user to a service, which is offered by an application server of an Internet Protocol Multimedia Subsystem, as well as a possible data flow between components of the system.

In FIG. 1, reference numeral 1 refers to a device of a user (user equipment). Device 1 is a communication terminal such as a mobile telephone supporting IP-based communication, e.g. a mobile telephone for a GSM-(Global System for Mobile Communication) supporting GPRS (General Packet Radio Service) or UMTS-network (Universal Mobile Telecommunications System), a personal digital assistant (PDA), or another personal computer supporting mobile communication over a mobile telephone network or WLAN. As was mentioned earlier, alternatively, device 1 is a fixed communication terminal configured for IP-based communication over a fixed network.

In FIG. 1, the reference IMS refers to a system including an IP Multimedia Subsystem adapted to carry out the proposed method for subscribing a user to a service offered by an application server of the IP Multimedia Subsystem. In FIG. 1, only components of the IP Multimedia Subsystem referenced in the description of the proposed method are illustrated.

As is illustrated in FIG. 1, the IP Multimedia Subsystem IMS includes a Call Session Control Function unit S-CSCF serving the user, as well as a Call Session Control Function unit S-CSCF' serving a public service identifier (PSI). The Call Session Control Function units S-CSCF, S-CSCF' are based on the specifications for the IP Multimedia Subsystem by the Third Generation Partnership Project (3GPP).

Furthermore, the IP Multimedia Subsystem IMS includes a Home Subscription Server HSS associated with the user as well as a Home Subscription Server HSS' associated with the PSI. The Home Subscription Servers HSS, HSS' are based on the specifications for the IP Multimedia Subsystem by the Third Generation Partnership Project (3GPP). The Home Subscription Server HSS contains the user profile 5 of the user, which includes filter criteria iCF associated with the user. The Home Subscription Server HSS' contains the user profile 6 of the PSI, which includes filter criteria CF associated with the PSI. The filter criteria iCF, CF include so called Service Trigger Points defining conditions on SIP requests. Moreover, the filter criteria iCF, CF include address information of application servers to be contacted in cases when conditions on a SIP request are met.

The system 1 illustrated in FIG. 1 also includes a first SIP application server SIP-AS1, providing a multimedia service 7, as well as a second SIP application server SIP-AS2, including a subscription message service 3. The second SIP application server SIP-AS2 is configured to handle subscriptions of the user to a variety of different services. The subscription message service 3 is preferably implemented as a programmed software module.

In the Home Subscription Server HSS', the user profile 6 of the PSI includes filter criteria CF with addressing information of the second SIP application server SIP-AS2. Moreover, the filter criteria CF includes Service Trigger Points which define conditions such that incoming SIP requests for defined multimedia services, e.g. the multimedia service 7 offered by the first SIP application server SIP-AS1, are forwarded to the second SIP application server SIP-AS2.

The Call Session Control Function unit S-CSCF serving the user and the Home Subscription Server HSS associated with the user are implemented on the same computer or on separate computers. Similarly, the Call Session Control Function unit S-CSCF' serving the PSI, the Home Subscription Server HSS' associated with the PSI, and the second SIP application server SIP-AS2, functioning as a subscription server, are implemented on the same computer or on separate computers. Typically, the first SIP application server SIP-AS1, providing the multimedia service 7, is implemented on a separate computer.

In the following paragraphs, possible sequences of steps executing the proposed method are described with reference to FIG. 1.

In step S0, by means of device 1, the user submits a SIP message with a request for a multimedia service addressed to the PSI of the service, for example "SIP:service@provider.net". For example, the SIP message is structured as: "MESSAGE from SIP:user@telecom.net to SIP:service@provider.net". For example, the SIP message is entered manually by the user using the data entry means 12. Alternatively, the SIP message is prepared by a software module of device 1, requesting via display 11 entry of the PSI of the service.

The SIP message, originated in device 1 and transmitted in step S0 over a telecommunications network, is received in the Call Session Control Function unit S-CSCF serving the user.

In step S1, the Call Session Control Function unit S-CSCF downloads and/or queries the user profile 5, including the filter criteria iCF, from the Home Subscription Server HSS associated with the user. For example, the Call Session Control Function unit S-CSCF accesses the Home Subscription Server HSS through a Diameter-based reference point called Sh.

Based on the user profile 5, the Call Session Control Function unit S-CSCF determines whether or not the filter criteria iFC associate the received SIP message with a SIP application server responsible for the requested service. If the SIP message is associated with a SIP application server, the SIP message is forwarded in step S8 via a so-called IP Multimedia Subsystem Service Control interface ISC1 to the respective SIP application server, for example the first SIP application server SIP-AS1. Otherwise, if no SIP application server is associated with the SIP message, in step S2, the SIP message is forwarded to the Call Session Control Function unit S-CSCF' serving the PSI. The SIP message is forwarded to the Call Session Control Function unit S-CSCF' via IP Multimedia Subsystem Service Control interface ISC2 using SIP routing in IMS. Specifically, the Call Session Control Function unit S-CSCF serving the user resolves the domain of the PSI via DNS (Domain Name Service) and forwards the SIP message to a so-called Interrogating Call Session Control Function unit (I-CSCF, not illustrated). The Interrogating Call Session Control Function unit queries the Home Subscription Server HSS' associated with the PSI to locate the Call Session Control Function unit S-CSCF' serving the PSI. Subsequently, the Interrogating Call Session Control Function unit forwards the SIP message to the Call Session Control Function unit S-CSCF' serving the PSI.

In step S3, the Call Session Control Function unit S-CSCF' serving the PSI downloads and/or queries the user profile 6 of the PSI from the Home Subscription Server HSS' associated with the PSI. For example, the Call Session Control Function unit S-CSCF' accesses the Home Subscription Server HSS' through a Diameter-based reference point called Sh.

In step S4, based on the addressing information included in the filter criteria FC associated with the PSI, the Call Session Control Function unit S-CSCF' serving the PSI forwards the SIP message to the second SIP application server SIP-AS2. The SIP message is forwarded via IP Multimedia Subsystem Service Control interface ISC3.

In step S5, a subscription message service 3 of the second SIP application server SIP-AS2 responds to the received SIP message with a SIP message including means for enabling the user to subscribe to the requested service. Preferably, the means for enabling the user to subscribe to the service include a hyperlink to a subscription service unit 2, 2', 2". In alternative embodiments, the means for enabling the user to subscribe to the service include an electronic form and/or a web page for the user to provide subscription data needed for the subscription process. In steps S6 and S7 the subscription message is routed to device 1 of the user.

The contents of the SIP message submitted in step S5 are displayed on display 11 of the user's device 1. Upon activation (clicking), the hyperlink initiates a subscription process between the user and the subscription service unit 2, 2', 2".

Figure 2:
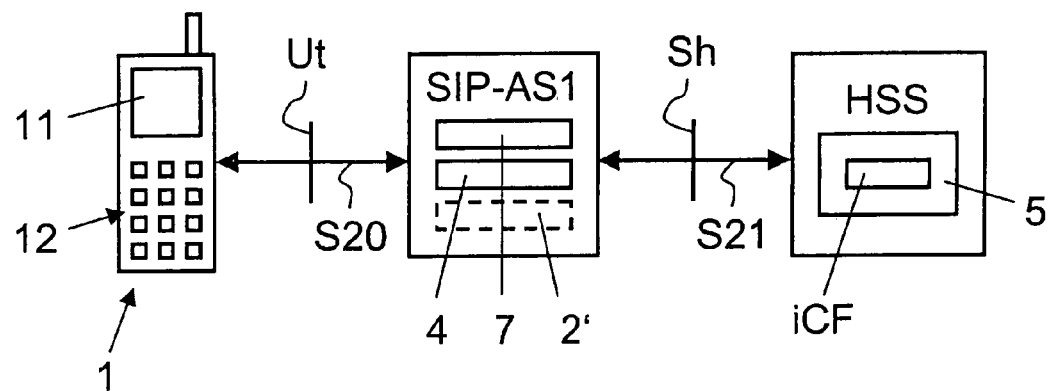
FIG. 2 shows a block diagram illustrating schematically a configuration of an embodiment of the system wherein a subscription service unit is located in the application server offering the service.

As is illustrated in FIG. 2, in one embodiment, the subscription service unit 2' is located in the first SIP application server SIP-AS1. Thus upon activation of the hyperlink, in step S20, device 1 accesses the subscription service unit 2' of the first SIP application server SIP-AS1 through an HTTP-based (Hypertext Transfer Protocol) interface such as a reference point called Ut. The user is prompted by the subscription service unit 2' to enter subscription data needed for the subscription process, for example name, address and billing information. Once the user has provided all the subscription data required by the subscription service unit 2', in step S21, the subscription service unit 2' modifies the user profile 5 of the user in the Home Subscription Server HSS associated with the user. For example, the subscription service unit 2' accesses the Home Subscription Server HSS through a Diameter-based reference point called Sh. In essence, the filter criteria iFC in the user profile 5 are modified such that future SIP messages requesting the multimedia service will be forwarded directly to the first SIP application server SIP-AS1 offering that service. Furthermore, the first SIP application server SIP-AS1 includes a registration service 4, which registers the user by storing the subscription data in a data repository. The registration service 4 is preferably implemented as a programmed software module.

Figure 3:
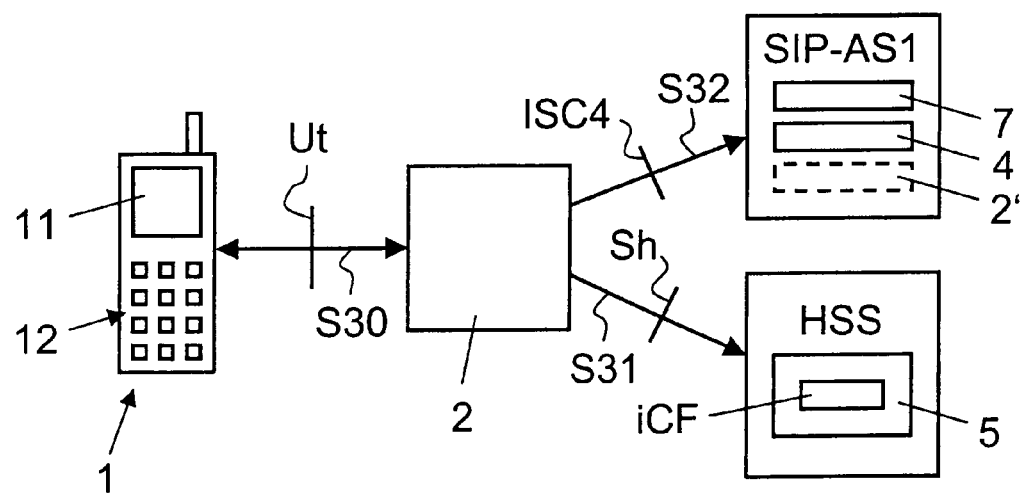
FIG. 3 shows a block diagram illustrating schematically a configuration of another embodiment of the system comprising a separate subscription service unit.

As is illustrated in FIG. 3, in another embodiment, the subscription service unit 2 is implemented as a separate server on a separate computer. Thus upon activation of the hyperlink, in step S30, device 1 accesses the stand-alone subscription service unit 2 through an HTTP-based (Hypertext Transfer Protocol) interface such as a reference point called Ut. The user is prompted by the subscription service unit 2 to enter the subscription data. Once all required subscription data has been received by the subscription service unit 2, in step S31, the subscription service unit 2 modifies the user profile 5 of the user in the Home Subscription Server HSS as described above with reference to FIG. 2. Furthermore, in step S32, the subscription service unit 2 transfers the subscription data to the first SIP application server SIP-AS1, where the registration service 4 registers the user by storing the subscription data in a data repository. For example, the subscription service unit 2 accesses the first SIP application server SIP-AS1 via IP Multimedia Subsystem Service Control interface ISC4. Steps corresponding to steps S30, S31 and S32 are executed, if the subscription service unit 2" is implemented as part of the second SIP application server SIP-AS2, as illustrated in FIG. 1. The subscription service unit 2, 2', 2" is preferably implemented as a programmed software module.

Alternatively, a more automatic redirection to a subscription web page may be achieved by the second SIP application server SIP-AS2 using a SIP REFER message.

The foregoing disclosure of the embodiments of the invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents. Specifically, in the description, the computer program code has been associated with specific software modules, one skilled in the art will understand, however, that the computer program code may be structured differently, without deviating from the scope of the invention. Furthermore, the particular order of the steps set forth in the specification should not be construed as limitations on the claims.

The invention claimed is:

1. A method of subscribing a user to a service offered by a first application server of an Internet Protocol Multimedia Subsystem, the method comprising:
   receiving from the user in a Call Session Control Function unit a request for the service;
   evaluating in the Call Session Control Function unit the request based on filter criteria associated with the user, for deciding whether or not the user is subscribed to the service;
   determining whether the filter criteria associates the service with any application server offering the service;
   forwarding the request, when the determining has determined that the filter criteria associating the service with any application server offering the service is absent, from the Call Session Control Function unit to a second application server configured to handle user subscriptions for the service; and
   transmitting a message from the second application server to the user, the message including means for enabling the user to subscribe to the service offered by the first application server,
   wherein, in response to subscription data received from the user, a subscription service unit modifies, in a home subscriber server, the filter criteria associated with the user such that the service is associated with the first application server.

2. The method according to claim 1, wherein the request for the service is addressed to a public service identifier of the service; wherein further filter criteria, including addressing information of the second application server, are stored associated with the public service identifier; and wherein the request is forwarded from the Call Session Control Function unit to the second application server based on the addressing information obtained from the further filter criteria associated with the public service identifier.

3. The method according to claim 1, wherein the means for enabling the user to subscribe to the service include a hyperlink to a subscription service unit, and wherein activating the hyperlink initiates a subscription process between the user and the subscription service unit.

4. The method according to claim 1, wherein the request for the service originates in a device of the user; wherein the request for the service is a Session Initiation Protocol request addressed to a public service identifier of the service; wherein the request for the service is transmitted via a telecommunications network;
   wherein the filter criteria associated with the user include conditions on requests and addresses of application servers, to which a particular request is to be forwarded in case conditions on the particular request are met; and wherein the first application server and the second application server are Session Initiation Protocol application servers.

5. A system for subscribing a user to a service offered by a first application server of an Internet Protocol Multimedia Subsystem, the system comprising:
   storage means for storing filter criteria associated with the user, and
   a Call Session Control Function unit configured to receive from the user a request for the service,
   wherein the Call Session Control Function unit is further configured to evaluate the request based on the filter criteria associated with the user, for deciding whether or not the user is subscribed to the service; and
   wherein the system further comprises:
   means for determining whether the filter criteria associates the service with any application server offering the service;
   means for forwarding the request, when the means for determining determines the filter criteria associating the service with any application server offering the service is absent, from the Call Session Control Function unit to a second application server configured to handle user subscriptions for the service; and
   means for transmitting a message from the second application server to the user, the message including means for enabling the user to subscribe to the service offered by the first application server,
   wherein the storage means for storing the filter criteria associated with the user are located in a home subscriber server; and wherein the system further comprises a subscription service unit configured to modify, in the home subscriber server, the filter criteria associated with the user such that the service is associated with the first application server.

6. The system according to claim 5, wherein the request for the service includes a public service identifier of the service; wherein the system comprises storage means for storing further filter criteria, including addressing information of the second application server, associated with the public service identifier; and wherein the Call Session Control Function unit is configured to forward the request to the second application server based on the addressing information obtained from the further filter criteria associated with the public service identifier.

7. The system according to claim 5, wherein the means for enabling the user to subscribe to the service include a hyperlink to a subscription service unit, the hyperlink being configured to initiate, upon activation of the hyperlink, a subscription process between the user and the subscription service unit.

8. The system according to claim 5, wherein the Call Session Control Function unit is connected to a telecommunications network and configured to receive the request for the service from a device of the user; wherein the request for the service is a Session Initiation Protocol request including a public service identifier of the service; wherein the filter criteria associated with the user include conditions on requests and addresses of application servers, to which a particular request is to be forwarded in case conditions on the particular request are met; and wherein the first application server and the second application server are Session Initiation Protocol application servers.

* * * * *